US009584512B2

(12) United States Patent
Barkan

(10) Patent No.: US 9,584,512 B2
(45) Date of Patent: Feb. 28, 2017

(54) VERIFYING AN ASSOCIATION BETWEEN AN APPLICATION AND A MOBILE DEVICE THROUGH A TELECOMMUNICATION NETWORK

(71) Applicant: Vokee Applications, Ltd., Petach Tikva (IL)

(72) Inventor: Elad Pinhas Barkan, Kfar-Sirkin (IL)

(73) Assignee: Vokee Applications, Ltd., Petach Tikva (IL)

( * ) Notice: Subject to any disclaimer, the term of this patent is extended or adjusted under 35 U.S.C. 154(b) by 0 days.

(21) Appl. No.: 14/693,839

(22) Filed: Apr. 22, 2015

(65) Prior Publication Data

US 2015/0230088 A1  Aug. 13, 2015

Related U.S. Application Data

(63) Continuation of application No. 14/423,984, filed as application No. PCT/IB2013/002338 on Aug. 26, 2013, now abandoned.

(Continued)

(51) Int. Cl.
*H04L 29/06* (2006.01)
*H04W 8/06* (2009.01)
(Continued)

(52) U.S. Cl.
CPC ...... *H04L 63/0876* (2013.01); *H04L 61/6054* (2013.01); *H04L 63/0853* (2013.01);
(Continued)

(58) Field of Classification Search
CPC .............. H04W 12/06; H04L 63/0876; H04M 3/42059; H04M 7/128
(Continued)

(56) References Cited

U.S. PATENT DOCUMENTS 5,881,226 A   3/1999   Veneklase
6,934,858 B2  8/2005   Woodhill
(Continued)

FOREIGN PATENT DOCUMENTS

WO   WO9519593    7/1995
WO   2009070529   6/2009
WO   2011008140   1/2011

OTHER PUBLICATIONS

"International Search Report and Written Opinion", counterpart International Application No. PCT/IB2013/002338; mailed May 20, 2014; 30 Pages.
(Continued)

*Primary Examiner* — Erica Navar
(74) *Attorney, Agent, or Firm* — Perkins Coie LLP

(57) ABSTRACT

A system for verifying an association between an application and a mobile computing device. The mobile computing device transmits a request to a service to verify the application, which has an application instance identifier. A mobile device identifier, used to establish a communication channel with the mobile computing device, is also conveyed to the service. The mobile computing device receives one or more telephone call setup messages directed to the mobile device identifier, each of which signal a voice call request, and provides an indication to the service of the receipt of the telephone call setup messages. In response to receiving the indication, the service establishes an association between the application instance identifier and the mobile device identifier.

18 Claims, 10 Drawing Sheets

Related U.S. Application Data

(60) Provisional application No. 61/727,744, filed on Nov. 18, 2012, provisional application No. 61/693,316, filed on Aug. 26, 2012.

(51) Int. Cl.

| | | |
|---|---|---|
| *H04M 3/42* | (2006.01) | |
| *H04W 12/06* | (2009.01) | |
| *H04M 1/725* | (2006.01) | |
| *H04L 29/12* | (2006.01) | |
| *H04W 8/04* | (2009.01) | |
| *H04M 7/12* | (2006.01) | |

(52) U.S. Cl.
CPC ........ *H04L 63/18* (2013.01); *H04M 1/72577* (2013.01); *H04M 3/42* (2013.01); *H04M 3/42042* (2013.01); *H04M 3/42059* (2013.01); *H04M 7/127* (2013.01); *H04W 8/04* (2013.01); *H04W 8/06* (2013.01); *H04W 12/06* (2013.01); *H04M 7/128* (2013.01)

(58) Field of Classification Search
USPC .......... 455/410, 411, 414.1–417, 432.1–433; 370/252, 352–356; 379/201.01–218.02
See application file for complete search history.

(56) References Cited

U.S. PATENT DOCUMENTS

| | | | |
|---|---|---|---|
| 7,383,572 B2 | 6/2008 | Rolfe | |
| 7,461,258 B2 | 12/2008 | Rolfe | |
| 7,574,733 B2 | 8/2009 | Woodhill | |
| 7,870,599 B2 | 1/2011 | Pemmaraju | |
| 8,484,698 B2 | 7/2013 | Pemmaraju | |
| 8,713,701 B2 | 4/2014 | Pemmaraju | |
| 8,774,379 B1 | 7/2014 | Youngs et al. | |
| 2001/0056473 A1* | 12/2001 | Arneson et al. | 709/217 |
| 2004/0010698 A1 | 1/2004 | Rolfe | |
| 2004/0209605 A1* | 10/2004 | Urban et al. | 455/415 |
| 2006/0229090 A1 | 10/2006 | LaDue | |
| 2008/0318548 A1 | 12/2008 | Bravo et al. | |
| 2009/0279682 A1* | 11/2009 | Strandell et al. | 379/201.02 |
| 2009/0305691 A1 | 12/2009 | Suetsugu et al. | |
| 2010/0029266 A1 | 2/2010 | Van Gassel et al. | |
| 2010/0130172 A1 | 5/2010 | Vendrow et al. | |
| 2011/0122866 A1 | 5/2011 | Vasamsetti et al. | |
| 2011/0161912 A1 | 6/2011 | Eteminan et al. | |
| 2011/0243125 A1 | 10/2011 | Kaal et al. | |
| 2012/0003983 A1 | 1/2012 | Sherlock et al. | |
| 2012/0208601 A1 | 8/2012 | Lockwood | |
| 2014/0109203 A1 | 4/2014 | Pemmaraju | |
| 2014/0294180 A1 | 10/2014 | Link, II | |

OTHER PUBLICATIONS

Notice of Allowance issued for U.S. Appl. No. 14/693,829 by Examiner Diane D. Mizrahi, Applicant: Vokee Application, Ltd., Petach Tikva, Israel, Date of Mailing: Aug. 21, 2015, 8 pages.

Anonymous, WhatsApp FAQ—Verification failed, what do I do? Aug. 23, 2012, XP055217194. Retrieved from the Internet at URL: http://www.whatsapp.com/faq/en/android/20970873 on Sep. 30, 2015, 2 pages.

Extended European Search Report for Application No. 15161629.9, Applicant: Elad Pinhas Barkan, Date of Mailing: Oct. 8, 2015, 7 pages.

\* cited by examiner

VERIFYING AN ASSOCIATION BETWEEN AN APPLICATION AND A MOBILE DEVICE THROUGH A TELECOMMUNICATION NETWORK

CROSS-REFERENCE TO RELATED APPLICATION(S)

This application is a continuation of U.S. patent application Ser. No. 14/423,984, filed on Feb. 25, 2015 and entitled "REDIRECTING CELLULAR TELEPHONE COMMUNICATIONS THROUGH A DATA NETWORK," which is a U.S. National Stage Entry of International Application No. PCT/IB2013/002338, filed on Aug. 26, 2013 and entitled "REDIRECTING CELLULAR TELEPHONE COMMUNICATIONS THROUGH A DATA NETWORK," which is related to and claims the benefit of U.S. Provisional Application No. 61/693,316, filed on Aug. 26, 2012 and entitled "APPARATUS, SYSTEM AND METHOD FOR FORWARDING COMMUNICATION IN NETWORK AND ITS PREVENTION", and U.S. Provisional Application No. 61/727,744, filed on Nov. 18, 2012 and entitled "FORWARDING SYSTEM AND METHOD AND DISCOVERY AND VERIFICATION OF MSISDN BY A MOBILE APP SYSTEM AND METHOD," all of which are incorporated herein by reference.

TECHNICAL FIELD

This description relates to mobile communications, and more particularly to authenticating mobile devices and forwarding cellular communications using data networks.

BACKGROUND

Systems for mobile telecommunications are typically deployed in a certain geographic area. Service is provided using cellular communication towers with antennas communicatively connected to a central office. In the central office there are core components that enable the different features of the network. For example, in GSM (Global System for Mobile Communications), one of these components is a Home Location Register (HLR). The HLR stores for each user a directory number also commonly known as Mobile Subscriber Integrated Services Digital Network-Number (MSISDN), or commonly referred to as a phone number. People call each other by dialing the MSISDN for the destination. During an incoming call or message there is a component in the mobile network that translates the dialed MSISDN to an International Mobile Subscriber Identity (IMSI) which is the identity that is used within the mobile network to reach the subscriber.

Each subscriber is identified in and authenticated to the network using a Subscriber Identity Module (SIM) card. This SIM card holds a secret number Ki (typically 128-bit), which is stored securely on the SIM card and cannot be read from the card. The same Ki is stored for the user in the network Authentication Center (AuC), which is usually deployed together with the HLR. The SIM card also stores the IMSI, though the IMSI is read from the card by the mobile phone. A mobile network can authenticate a mobile phone asking for services from the network by verifying that the mobile phone has a SIM card that contains the secret Ki for that user. The authentication protocol between the mobile phone and the network typically involves sending a message in which the phone identifies itself, initially with its IMSI that the mobile phone reads from the SIM card. In response, the network challenges the mobile phone with a challenge C. The mobile phone transfers this challenge C to the SIM card, which uses its secret Ki to compute a response F(C,Ki). F is a cryptographically designed function such that from knowing (or even choosing C), and obtaining F(C,Ki) it is practically impossible to find the secret Ki, hence for a given IMSI, only the authentic SIM card can compute F(C,Ki) as only the authentic SIM has Ki. The Authentication Center also stores the secret Ki for that IMSI and can thus compute F(C,Ki) and verify the response by the mobile phone, thereby verifying that the authentic SIM card is in the phone. Some variations of this general protocol can also be implemented. For example, the mobile phone can authenticate the network to verify that the mobile phone is not being connected to a fake network.

The network can initiate authentication for every service it provides to the mobile phone including for incoming services such as receiving a call or a Short Message Service (SMS). The network can also ask the phone to encrypt the conversation between the network and the phone, where the encryption keys are derived from C and Ki in a similar way to the authentication and typically as part of the authentication process. For example, some of the bits of F(C,Ki) can be returned to the network as a proof of holding Ki, and some of the bits can be kept by the phone as encryption and/or integrity keys. The HLR also stores the last known location for each user. Each cell tower is typically associated with a Mobile Switching Center (MSC) that routes calls and handles needed mobility management to keep calls, data, SMS, and other mobile services working even when users are moving between cell towers and even if the cell towers belong to different MSCs.

Each MSC has an associated Visitor Location Register (VLR). A VLR is a network component that keeps track of the cell location of each user in the coverage area of the MSC and associated VLR. The VLR reports the location of the mobile phone to the HLR associated with the mobile phone. Depending on the network configuration, a VLR can update the HLR when a user first enters the coverage of that specific VLR, but not update for every cell change in that VLR. In other cases, more detailed reporting is carried between the VLR to the HLR. For instance, the VLR can notify the HLR once a certain time-period has passed since receiving the current location of a mobile device. Alternatively, the VLR can update the HLR of every instance when the user changes cell towers, or with every location area change (e.g., where a location area is defined as one or more cells indicated as belonging to a location area. Each cell can belong to one location area, and each location area can belong to one VLR).

In addition to voice services, cellular service providers have deployed other services such as the ability to send and receive text messages to and from other users, a service commonly referred to as SMS (short message service).

A need often arises for users to travel with their mobile phone outside the coverage area of their home network, i.e., out of the coverage area of their mobile service provider that provides the user with a mobile subscription. To address such situations, mobile operators are typically connected in a series of roaming agreements with other operators or roaming brokers to provide roaming services to their subscribers. Such agreements allow users to obtain mobile service even when they are outside of their home network, although such roaming services are typically expensive relative to service within the user's home network.

Most signaling communication, as well as some of the data communication (such as SMS) is carried over a signaling network called Signaling System No. 7 (SS#7 or SS7). This network is used for communication inside a provider's network, and operators that have roaming agreements are typically also connected over SS7 networks. As networks are transitioning to an all-IP network, the SS7 is being complemented and replaced with other standards such as the Diameter protocol.

As telecommunication evolved, new types of communications also emerged, such as Voice over IP (VoIP), where users can receive and make phone calls over the Internet. Applications that allow receiving and sending short messages also emerged. These services sometimes communicate over a data network, typically carrying data over IP (Internet Protocol). As users consume these services on various devices such as personal computers, laptop devices, tablet devices, handheld phones, PDAs and the like, although such services generally are distinct from conventional cellular communications and require use of an application on the device or accessed through a web page.

SUMMARY

In accordance with aspects described in this specification, users can retain their identity in the mobile world (i.e., their MSISDN) even when using an application. For example, it may be desired for users to receive their incoming SMS through an application or software on one of their devices rather than on the user's mobile phone. Similarly, a user may wish to receive incoming calls directed to their MSISDN through an application. Techniques can be implemented to discover and verify an MSISDN for use by an application and routing calls directed to the MSISDN over a data network rather than a conventional routing through the cellular network. Other aspects include corresponding apparatus, systems, and computer software, stored on a computer storage medium and executable on one or more computers.

In one general aspect, a method includes receiving a telephone call setup message from a mobile device directed to a telephone number associated with a server, wherein the server is adapted for discovery of a mobile device identifier for the mobile device and the telephone call setup message is initiated by an application on the mobile device; and associating the mobile device identifier with the application in response to receiving the telephone call setup message from the mobile device directed to the telephone number. Other aspects include corresponding apparatus, systems, and computer software, stored on a computer storage medium and executable on one or more computers.

Implementations can include one or more of the following features. A code is sent to the mobile device using the mobile device identifier; a communication is received from the mobile device based on the code, wherein the communication is sent by the application; and associating the communication with the telephone call setup message after verifying the communication is based on the code. The communication further includes a unique identifier of an application instance on the mobile device, the method further comprising storing an association of the unique application instance identifier with the mobile device identifier. A unique identifier of an application instance on the mobile device is associated with the mobile device identifier; and an additional telephone call setup message to the mobile device is initiated using the mobile device identifier. The additional telephone call setup message includes a selected identifier, where the selected identifier is for use in verifying the association of the application instance identifier with the mobile device identifier; and the association of the application instance identifier with the mobile device identifier is verified based on detecting the selected identifier in the additional telephone call setup message. A request is received from the application on the mobile device for the telephone number; and the telephone number is provided in response to the request, wherein the application uses the telephone number to initiate the telephone call setup message. The request includes a unique identifier of an application instance on the mobile device, and an association of the unique application instance identifier with the mobile device identifier is stored in response to receiving the telephone call setup message directed to the telephone number. A unique identifier of an application instance on the mobile device is associated with the mobile device identifier; an additional telephone call setup message to the mobile device is initiated using the mobile device identifier, wherein the additional telephone call setup message includes a selected identifier, with the selected identifier for use in verifying the association of the application instance identifier with the mobile device identifier; and the association of the application instance identifier with the mobile device identifier is verified based on detecting the selected identifier in the additional telephone call setup message. A user interface display on the mobile device is disabled for a telephone call that results in the telephone call setup message. The mobile device identifier is an international mobile station identity (IMSI). The mobile device identifier comprises a mobile subscriber integrated services digital network number (MSISDN). The mobile device identifier is included in the telephone call setup message as a caller ID header. Access to a service associated with the application is authorized based, at least in part, on associating the mobile device identifier with the application. A telephone call requested in the telephone call setup message is terminated before a voice connection is established.

In another general aspect, a method includes receiving a request to access a service to be provided for a mobile device; providing a telephone number associated with a server adapted for discovery of a mobile device identifier associated with the mobile device requesting access to the service; receiving a telephone call setup message from the mobile device directed to the telephone number; and associating the mobile device identifier with the request for access to the service in response to receiving the telephone call setup message from the mobile device directed to the telephone number. Other aspects include corresponding apparatus, systems, and computer software, stored on a computer storage medium and executable on one or more computers.

Implementations can include one or more of the following features. The request to access a service on the mobile device is received from an application on the mobile device and includes a request to activate the application for use on the mobile device, the application has an associated application instance identifier, and associating the mobile device identifier with the request for access to the service includes associating the mobile device identifier with the application instance identifier. The method further includes initiating an additional telephone call setup message to the mobile device using the mobile device identifier, wherein the additional telephone call setup message includes a selected identifier, with the selected identifier for use in verifying the association of the application instance identifier with the mobile device identifier; and verifying the association of the application instance identifier with the mobile device identifier based on detecting the selected identifier in the additional telephone call setup message. A user interface display on the mobile device is disabled for a telephone call that results in the telephone call setup message.

In another general aspect, a computer storage medium is encoded with a computer program, and the program includes instructions that when executed by data processing apparatus cause the data processing apparatus to perform operations including initiating a telephone call setup message directed to a telephone number associated with a server, wherein the server is adapted for discovery of a mobile device identifier for a mobile device; receiving an incoming communication from the server in response to the telephone call setup message, wherein the incoming communication includes a code; and sending an outgoing communication to the server in response to the incoming communication, wherein the outgoing communication includes the code and an application instance identifier for use in associating the mobile device identifier and the application instance identifier. Other aspects include corresponding apparatus, systems, and methods.

Implementations can include one or more of the following features. The operations further include disabling a restriction on including a caller ID in the telephone call setup message. The operations further include terminating a telephone call requested in the telephone call setup message before a voice connection is established.

In another general aspect, a computer storage medium is encoded with a computer program, and the program includes instructions that when executed by data processing apparatus cause the data processing apparatus to perform operations including sending a request for a telephone number, wherein the request is sent to a server adapted for discovery of a mobile device identifier for a mobile device and the request includes an application instance identifier; receiving a response to the request, wherein the response includes a telephone number; and initiating a telephone call setup message directed to the telephone number for use in associating the mobile device identifier and the application instance identifier, wherein the server is adapted for discovery of a mobile device identifier for a mobile device. Other aspects include corresponding apparatus, systems, and methods.

Implementations can include one or more of the following features. The operations further include disabling a restriction on including a caller ID in the telephone call setup message. The operations further include terminating a telephone call requested in the telephone call setup message before a voice connection is established.

In another general aspect, a computer storage medium encoded with a computer program, the program comprising instructions that when executed by data processing apparatus cause the data processing apparatus to perform operations including disabling a user interface display on the mobile device for a telephone call; initiating a telephone call setup message after disabling the user interface display, wherein the telephone call setup message is directed to a telephone number associated with a server adapted for discovery of a mobile device identifier for a mobile device; and sending an outgoing communication to the server, wherein the outgoing communication includes an application instance identifier for use in associating the mobile device identifier and the application instance identifier. Other aspects include corresponding apparatus, systems, and methods.

In another general aspect, a system includes a mobile device having an application adapted to initiate a telephone call setup message to a telephone number and one or more servers. The one or more servers are adapted to identify a mobile device identifier based on the telephone call setup message; receive an application instance identifier for the application sent by the application; and associate the mobile device identifier with application instance identifier. Other aspects include corresponding apparatus, methods, and computer software, stored on a computer storage medium and executable on one or more computers.

Implementations can include one or more of the following features. The one or more servers are further adapted to send a message including a code to the mobile device using the mobile device identifier; receive a communication from the mobile device including the code and the application instance identifier, wherein the communication is sent by the application on the mobile device; and associate the communication with the telephone call setup message based on the code, wherein the mobile device identifier is associated with application instance identifier based on the association between the communication with the telephone call setup message. The application is adapted to send a message to the one or more servers to request the telephone number and provide the application instance identifier, and the one or more servers are adapted associate the mobile device identifier with application instance identifier based on the telephone call setup message. The one or more servers are further adapted to initiate an additional telephone call setup message to the mobile device using the mobile device identifier, wherein the additional telephone call setup message includes a selected identifier, with the selected identifier for use in verifying the association of the application instance identifier with the mobile device identifier; and verify the association of the application instance identifier with the mobile device identifier based on detecting the selected identifier in the additional telephone call setup message. At least one of mobile device or the one or more servers are further adapted to terminate a telephone call requested in the telephone call setup message before a voice connection is established.

In another general aspect, a method includes receiving a request to verify an application on a mobile device, wherein the application has an associated application instance identifier; obtaining a mobile device identifier used to communicate with the mobile device; initiating one or more telephone call setup messages directed to the mobile device using the mobile device identifier, wherein the one or more telephone call setup messages are initiated by a server for use in verifying an association of the application instance identifier with the mobile device identifier; and associating the application instance identifier with the mobile device identifier based on detecting the one or more telephone call setup messages. Other aspects include corresponding apparatus, systems, and computer software, stored on a computer storage medium and executable on one or more computers.

Implementations can include one or more of the following features. The application detects a sequence of telephone call setup messages and reports the sequence of the telephone call setup messages to a server, with the association of the application instance identifier with the mobile device identifier is based on the reported sequence of the telephone call setup messages. At least one of the telephone call setup messages includes a selected identifier, with the selected identifier determined by a server for use in verifying an association of the application instance identifier with the mobile device identifier, and the association of the application instance identifier with the mobile device identifier is based on detecting the selected identifier in at least one of the telephone call setup messages. The application reports to a server through a data network based on the selected identifier. The selected identifier is included in the telephone call setup message as a caller ID header. The method further includes requesting call forwarding for the mobile device to a selected destination; and verifying the association of the application instance identifier with the mobile device identifier based on forwarding of the one or more telephone call setup messages to the selected destination. The call forwarding is initiated by a server using the mobile device identifier. The call forwarding is initiated by an application on the mobile device. The mobile device identifier comprises an international mobile station identity (IMSI). The mobile device identifier comprises a mobile subscriber integrated services digital network number (MSISDN). The association of the application instance identifier with the mobile device identifier is verified, and the verification is based at least in part on the selected identifier included in the one or more telephone call setup messages. A user notification on the mobile device of telephone calls corresponding to the one or more telephone call setup messages is disabled. A service is provided to the application on the mobile device in response to verifying the association of the application instance identifier with the mobile device identifier.

In another general aspect, a computer storage medium encoded with a computer program, the program comprising instructions that when executed by data processing apparatus on a mobile device cause the data processing apparatus to perform operations including transmitting an application instance identifier to a server system; detecting one or more one or more telephone call setup messages directed to the mobile device using a mobile device identifier, wherein the one or more telephone call setup messages are initiated by the server system for use in verifying an association of the application instance identifier with the mobile device identifier; and sending one or more reports to the server system over a data network including information obtained from the detection of the one or more telephone call setup messages, wherein the one or more reports include the application instance identifier. Other aspects include corresponding apparatus, systems, and methods.

Implementations can include one or more of the following features. The one or more telephone call setup messages include a sequence of telephone call setup messages the one or more reports include information regarding the sequence of the telephone call setup messages. At least one of the one or more telephone call setup messages includes a selected identifier, with the selected identifier determined by a server for use in verifying an association of the application instance identifier with the mobile device identifier, and at least one of the one or more reports includes information regarding the selected identifier. The operations further include disabling a user notification on the mobile device of a telephone call corresponding to the one or more telephone call setup messages.

In another general aspect, a computer storage medium encoded with a computer program, the program comprising instructions that when executed by data processing apparatus on a mobile device cause the data processing apparatus to perform operations including transmitting an application instance identifier to a server system; requesting call forwarding for the mobile device to a selected destination; and communicating with the server system to initiate one or more telephone call setup messages to the mobile device using a mobile device identifier, wherein the one or more telephone call setup messages are initiated by a server system for use in verifying an association of the application instance identifier with the mobile device identifier. Other aspects include corresponding apparatus, systems, and methods. The operations further include canceling call forwarding for the mobile device. The operations further include receiving an identification of the selected destination from the server system. Communicating with the server system to initiate one or more telephone call setup messages includes sending a message to the server system indicating that call forwarding to the selected destination is initiated. The operations further include disabling a user notification on the mobile device of a telephone call corresponding to the one or more telephone call setup messages. Other aspects include corresponding apparatus, systems, and methods.

In another general aspect, a system includes a mobile device having an installed application with a corresponding application instance identifier and one or more servers. The one or more servers are adapted to receive a mobile device identifier used communicate with the mobile device; receive the application instance identifier; associate the mobile device identifier with the application instance identifier; initiate one or more telephone call setup messages directed to the mobile device using the mobile device identifier; and verify the association of the mobile device identifier with the application instance identifier based on a detection of the one or more call setup messages. Other aspects include corresponding apparatus, methods, and computer software, stored on a computer storage medium and executable on one or more computers.

Implementations can include one or more of the following features. The application is adapted to detect a sequence of telephone call setup messages and report the sequence of the telephone call setup messages to the one or more servers, and the one or more servers are adapted to verify the mobile device identifier with the application instance identifier based on the reported sequence of the telephone call setup messages. At least one of the telephone call setup messages includes a selected identifier, with the selected identifier determined by the one or more servers, and the association of the application instance identifier with the mobile device identifier is based on detecting the selected identifier in at least one of the telephone call setup messages. At least one of the mobile device or the one more servers are adapted to activate call forwarding for the mobile device to a selected destination, and the association of the mobile device identifier with the application instance identifier is verified based on receiving a forwarded telephone call setup message at the selected destination.

In another general aspect, a method includes registering a cellular telephone identifier with a visitor location register associated with a bridge mobile switching center adapted to receive communication through a cellular backbone network and route communications over a packet-switched network; determining that cellular communications using the cellular telephone identifier are disabled; notifying a home location register associated with the cellular telephone that the cellular telephone is roaming in a network served by the visitor location register; receiving a communication directed to the cellular telephone at the bridge mobile switching center; and routing the received communication to the cellular telephone. Other aspects include corresponding apparatus, systems, and computer software, stored on a computer storage medium and executable on one or more computers.

Implementations can include one or more of the following features. The received communication is routed to the cellular telephone over a packet-switched network. The cellular telephone is registered with the visitor location register using a wireless access point and the Internet Protocol network. The received communication comprises one of a voice call, a text message, an image message, or a video call.

The received communication is redirected to a different destination upon detecting a deteriorating wireless packet-switched connection. Disabling cellular communications and notifying the home location register that the cellular telephone identifier is roaming in a network served by the visitor location register are performed in response to detecting adequate connectivity through the wireless access point to support voice over Internet Protocol communications. Disabling cellular communications and notifying the home location register that the cellular telephone is roaming in a network served by the visitor location register are performed in response to satisfying one or more parameters. The received communication is directed to a number associated with a first subscriber identity module and the received call is routed to a number associated with a second subscriber identity module installed in a cellular telephone. The visitor location register provides a roaming number to the home location register, with the roaming number selected so as to avoid toll charges. A call log on the cellular telephone is synchronized between calls connected using a cellular connection and calls connected using the Internet Protocol network.

In another general aspect, a computer storage medium encoded with a computer program, the program comprising instructions that when executed by data processing apparatus on a mobile device cause the data processing apparatus to perform operations including sending a request to a server over a packet-switched network for telephone services associated with a cellular telephone identifier, wherein the server is adapted to register the cellular telephone identifier with a visitor location register associated with a bridge mobile switching center adapted to receive communication through a cellular backbone network and route communications over a packet-switched network and the visitor location register is adapted to notify a home location register associated with the cellular telephone that the cellular telephone is roaming in a network served by the visitor location register; disabling cellular communications using the cellular telephone identifier on the mobile device; and receiving a communication directed to the cellular telephone identifier from the bridge mobile switching center over a packet-switched network. Other aspects include corresponding apparatus, systems, and methods.

Implementations can include the following feature. The request includes an application instance identifier associated with the cellular telephone identifier before sending the request.

In another general aspect, a system includes a server adapted to communicate with an application on a mobile device and to establish voice over Internet protocol communications with the mobile device using the application; a bridge mobile switching center adapted to receive communication through a cellular backbone network and route communications over a packet-switched network; and a visitor location register associated with the bridge mobile switching center, wherein the visitor location register is adapted to notify a home location register associated with a cellular telephone identifier for the mobile device that the mobile device with the cellular telephone identifier is roaming in a network served by the visitor location register. Other aspects include corresponding apparatus, methods, and computer software, stored on a computer storage medium and executable on one or more computers.

Implementations can include one or more of the following features. The application on the mobile device is adapted to disable cellular communications for the cellular telephone identifier. The visitor location register is further adapted to confirm that the cellular telephone identifier is not registered in another cellular network before notifying the home location register that the mobile device with the cellular telephone identifier is roaming in the network served by the visitor location register.

In another general aspect, a method includes detecting use of a visitor location register to forward calls to a mobile device using a packet-data network; and blocking calls to the mobile device from being forwarded to the visitor location register based on the detected use. Other aspects include corresponding apparatus, systems, and computer software, stored on a computer storage medium and executable on one or more computers.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
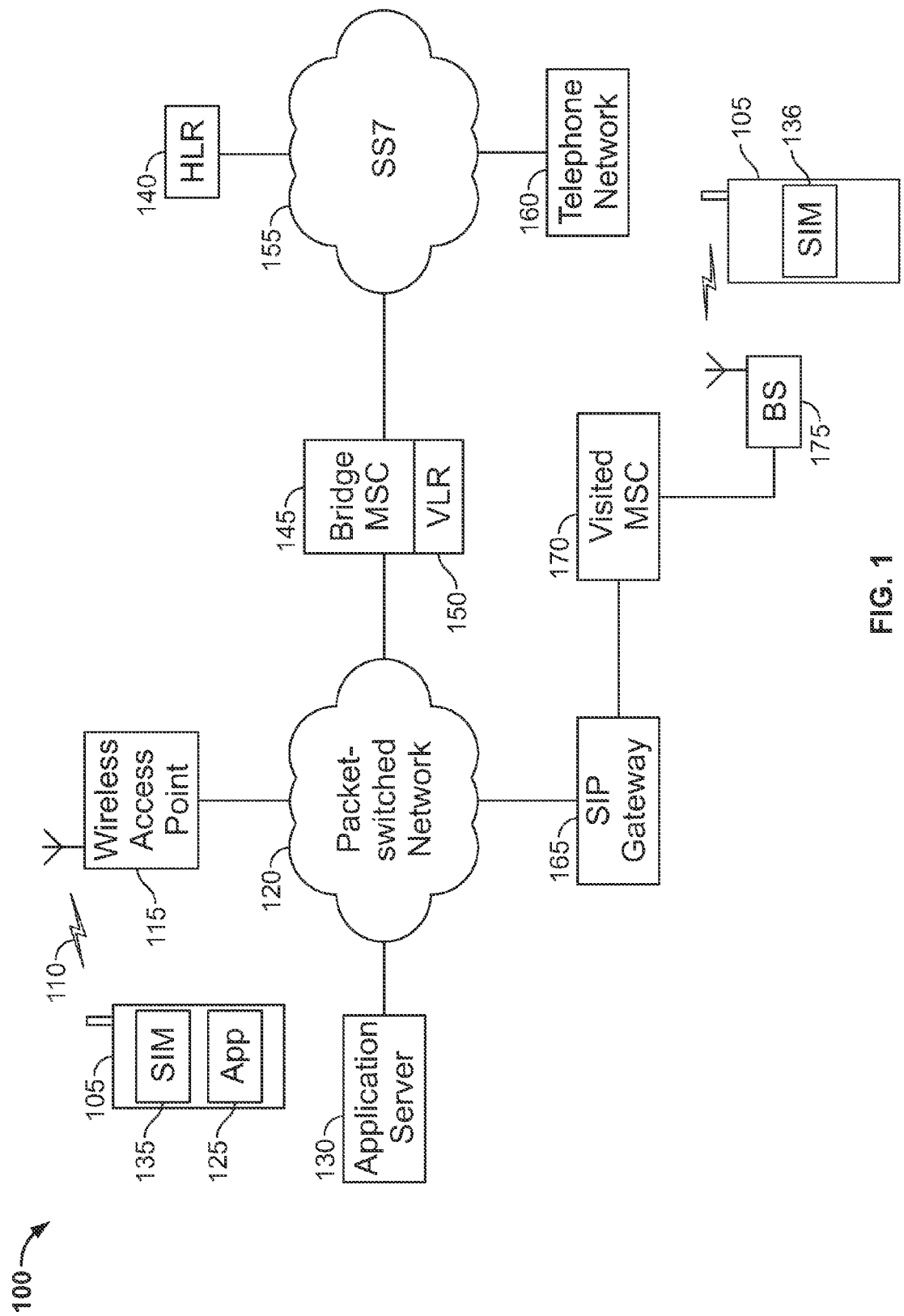
FIG. 1 illustrates a communication system that allows a mobile device to maintain a cellular identity and access services associated with the cellular identity using a packet-switched data network connection.

In accordance with aspects described in this specification, users can retain their identity in the mobile world (i.e., their MSISDN) even when using an application to conduct mobile communications (e.g., voice calls, short message service (SMS) or other text messages, video calls, or image messages). For example, it may be desired for users to receive their incoming SMS through an application or software on one of their devices rather than on the user's mobile phone. Similarly, a user may wish to receive incoming calls directed to their MSISDN through an application that communicates over a WiFi access point and a packet-data network.

Routing Communications Directed to a Cellular Identity Through a Packet-Switched Network To facilitate such capabilities, an alternative service provider can implement a system in which an application on a mobile device registers with a server that is capable of sending and receiving communications to and from the mobile device over a packet-switched network, at least when the mobile device has adequate access to a Wi-Fi or other data connection. The server can connect with a cellular network through a network component that receives communications over a conventional cellular network and forwards the communications over the Internet. The network component can communicate with the cellular network as a typical mobile switching center (MSC) and associated visitor location register (VLR), while communicating over the Internet using Internet Protocol, for example. To receive incoming communications directed to the mobile device subscriber's phone number, this network component can notify the subscriber's home location register (HLR) that the subscriber's mobile device (with the subscriber's subscriber identity module (SIM)) is registered within a cellular network served by the network component, even when the mobile device is actually connected to the network component through an Internet connection and may be physically located virtually anywhere that Internet access is available. This network component can be viewed as a novel Visitor Location Register (nVLR) and can be combined with the server that provides the service, although the various functions may also be distributed across multiple components.

In an illustrative embodiment, a user notifies an alternative service provider (ASP) that the user is interested in receiving cellular communications directed to the user's MSISDN through the ASP's application and supplies the ASP with the user's MSISDN (which is registered through the user's home service provider). For security purposes, the ASP can verify that the user is actually the holder of the MSISDN. This verification can be performed, for example, by using the ASP's application to cause the user's phone to dial call a certain number associated with the ASP and identifying the caller ID for the incoming call, calling the user and asking the user to dial some DTMF digits to authenticate that the MSISDN belongs to the user and that the user is interested in the service, sending an SMS to the user's MSISDN and verifying that the user received the SMS and is interested in the service, having the user's phone send an SMS to a service number to verify the MSISDN, and so on.

The ASP can connect to the SS7 network through a cellular operator that is willing to provide access for use by the ASP and that has a roaming agreement with the home cellular operator of the subscriber. The ASP, the cellular operator, or some other entity can operate a novel VLR mentioned above and further described below.

Provision of the ASP's service may typically be limited to situations in which the mobile device is not already operating in another cellular network (including the user's home network) to avoid conflicting cellular registrations. Thus, it may be desirable to confirm that the user's mobile device's SIM is not already actively registered in another cellular network before informing the HLR that the mobile device is roaming in an area served by the novel VLR. For example, once forwarding for a specific MSISDN is requested (e.g., through an application on the user's mobile device), the ASP can obtain the user's IMSI by issuing a Send-Routing-Info-For-Short-Message (referred to sometimes as SRI4SM) to the HLR of the user. This message is conventionally used to find the IMSI and VLR associated with a particular MSISDN for the purpose of delivering short messages to a subscriber. If the SIM is online and registered, the HLR will typically respond with the SIM's IMSI by sending an Ack(IMSI,VLR) message, together with the VLR SS7-address that is currently serving the SIM. If the SIM is offline, i.e., it is not in a mobile phone which is active and registered, the HLR will typically send, in response to the SRI4SM, a Reject message or a message indicating the user is not available to receive SMS. In this manner, the ASP can limit its service to cases where the SIM is not active by querying the HLR and continuing only if the user is not active. Other techniques for verifying that the SIM is not currently active and registered can also be used.

The nVLR can then notify the subscriber's HLR that the SIM is roaming in its network by providing the HLR with the IMSI of the user in an Update Location Message—UL (IMSI). In other words, the nVLR can register as the VLR for this subscriber's IMSI through the roaming agreement between the home cellular operator and the cellular operator that provides access to the ASP. The HLR can acknowledge this request by sending an Insert Subscriber Data Message (ISD), and the nVLR can also request authentication vectors (containing C, and F(C,Ki)) for authenticating the SIM by sending a Send Authentication Info (SAI) message.

Thereafter, when a Short Message Service Center (SMSC) sends an SMS message directed to the user's MSISDN, the SMSC interrogates the HLR, which returns the nVLR SS7 address. Using this address, the SMSC delivers the SMS message to the nVLR. The nVLR can then forward the message to the application associated with the user's MSISDN or translate the identity to another MSISDN or IMSI and forward the message directly to the subscriber through the application or, if the user has opted to have messages forwarded to an alternative SIM, through another SMSC to a device with the alternative SIM. The nVLR can return a success or failure to the SMSC sending the message based on if the message is successfully delivered. Alternatively, the nVLR can answer a fixed answer such as success on all messages it receives for subscribers. As typically there is no extra charge for incoming SMS messages even while roaming, there is no extra charge for the user for the incoming SMS message.

In this manner, the nVLR causes the user's SIM and/or corresponding mobile device associated with the MSISDN to appear towards its HLR as roaming in the network of the cellular operator that supports the nVLR, while the mobile device and/or SIM may actually be located in another territory. As operators commonly send special SMS messages to users while roaming, these messages can cause confusion for such a user that is either not roaming in another territory or is roaming in a territory different than the territory identified in the HLR. In some implementations, the ASP can discard these SMS messages to avoid confusion for the user.

The nVLR can also notify the home HLR of a mobile station roaming number (MSRN) for the user's cellular subscription, forwarding all calls to the ASP-determined number. This number can represent a gateway or bridge mobile switching center, which translate incoming calls to Voice over IP instance. The MSRN can be selected to be in the territory of the home cellular operator or another territory with no or relatively low roaming rates to reduce costs for the user (e.g., to avoid long distance or international toll charges).

In some circumstances, an HLR can notify a VLR, and similarly the nVLR, to cancel the user's registration in the VLR. If such a cancellation occurs, the nVLR can repeat the roaming notification process and register the user again. If the user activates the SIM in a mobile phone, which registers with a different cellular network, the home HLR typically notifies the old VLR. Thus, the home HLR may notify the nVLR that the user is no longer registered with the nVLR. In cases where the HLR does not notify the nVLR, the nVLR can detect that the user activated the SIM in another network by periodically interrogating the home HLR by sending a Send Routing Info for Short Message; and if the HLR returns a message indicating that the serving VLR is different than the nVLR address, the nVLR can determine that the has user activated the SIM in a cellular network. In such a case, the nVLR can release the MSRN (e.g., for assignment to other mobile devices). Alternatively or in addition, the nVLR can notify an application installed on the user's mobile device through a server that communicates with the application.

The nVLR can also be used to send SMS messages for the user. For example, a message to be sent can be provided to the nVLR through a server that receives outgoing messages from an application installed on the mobile device. The nVLR can then contact the home SMSC of the user, and send the SMS message to the SMSC a originating from the user's IMSI. Delivery status reports can be sent back to the server and forwarded to the application on the mobile device. In addition, the CAMEL interface can be used to interrogate the home operator on different services that need to be provided for the users. Other techniques for interrogation of the home cellular operator with respect to a user's IMSI can also be used, and other services can be provided for the MSISDN and/or IMSI.

FIG. 1 illustrates a communication system 100 that allows a mobile device to maintain a cellular identity and access services associated with the cellular identity using a packet-switched data network connection. The system 100 includes a mobile device 105 that includes dual capabilities for communicating over a cellular radio network and over a wireless local area network (WLAN). When communicating over a WLAN, the mobile device 105 communicates over a wireless interface 110 with a wireless access point 115 that is connected to a packet-switched network 120, such as the Internet. The mobile device 105 includes an installed application 125 that communicates through the wireless access point 115 and the packet-switched network 120 with an application server 130 that provides packet-switched communication services to the mobile device 105 through the application 125. For example, the application server 130 can provide voice over Internet protocol (VoIP) services, text messaging, video communication, and image messaging services to the application 125. Although the application 125 is described as being installed on the mobile device 105, in some implementations, some or most of the application functionality can reside on a server with more limited or minimal functionality defined by instructions stored more permanently in nonvolatile memory on the mobile device 105. Instructions can be retrieved as necessary for execution on the mobile device 105 and/or instructions can be executed on the application server 130. Moreover, in some implementations, the mobile device 105 may simply store a pointer to the application server and an application instance identifier used to differentiate use of the application functionality stored on the application server 130 by the mobile device 105 from use of the application functionality by other mobile devices. The application instance identifier can be encrypted to prevent tampering or otherwise maintain security. In other implementations, all of the functionality of the application 125 can be stored on the application server 130. The user of mobile device can activate and deactivate the service, or change the service configuration through a web interface with the server, or by other remote interaction as such SMS commands, Interactive Voice Response (IVR), etc.

The mobile device 105 further includes a subscriber identity module (SIM) 135 that enables the mobile device 105 to access cellular services over a cellular radio network. The SIM 135 includes a subscription with a home cellular network that stores information about the SIM 135 and services available under the subscription in a home location register (HLR) 140. Among other things, the SIM 135 and the HLR 140 store unique identification information for the SIM 135 including an IMSI and an MSISDN.

In the system 100, the application 125 and the application server 130 enable the mobile device 105 to associate the unique identifier for the SIM 135 and access services provided through the home cellular network while the mobile device is not connected to a cellular network or when the mobile device has a different SIM installed by associating a unique identifier for the particular application instance installed on the mobile device 105 with the SIM identity (e.g., the IMSI and MSISDN). In particular, the application server 130 can communicate with the HLR 140 through a bridge mobile switching center (MSC) 145 and associated VLR 150 (which together correspond to the nVLR described above). The application server 130 can communicate with the bridge MSC 145 and VLR 150 over a packet-switched network 120, or the application server 130 can be co-located or even incorporated as a component of the bridge MSC 145 or the VLR 150. The bridge MSC 145 and VLR 150 communicate with the HLR 140 over a cellular backbone, such as SS7 network 155. The application 125 or the application server 130 can request access to services supported by the user's home cellular network and the HLR 140 automatically (e.g., according the certain criteria) or in response to a user interaction with the application 125. In response, the application server 130 can contact the VLR 150 to cause the VLR 150 to send a registration message notifying the HLR 140 that the mobile device 105 with the associated SIM 135 is roaming in the cellular network served by the bridge MSC 145 and VLR 150. In some cases, before notifying the HLR 140 that the mobile device is roaming, communications with a cellular radio access network using the SIM 135 are disabled either by the application 125 or manually by a user. For example, the SIM 135 can be disabled or removed from the mobile device 105 or the cellular radio for the mobile device can be turned off, e.g., by putting the phone in Airplane mode with WiFi. Such disabling of cellular communications using the SIM 135 can avoid conflicting registrations between the VLR 150 and another VLR serving an area in which the mobile device 105 is currently located. In some implementations, the VLR 150 can query the HLR 140 to confirm that the SIM 135 is not registered in another cellular network.

When the VLR 150 sends the registration notification to the HLR 140, the VLR 150 can provide an MSRN. The VLR 150 can also request subscription information for the SIM 135, e.g., requesting an identification of services to which the user subscribes.

After the registration is complete, if a communication (e.g., a call or SMS message) directed to the mobile device (e.g., using the MSISDN for the SIM 135) is initiated through a telephone network 160, the HLR 140 is queried in a conventional manner and returns an MSRN obtained from the VLR 150 and associated with the bridge MSC 145. The communication is thus routed to the bridge MSC 145, which in turn contacts the application server 130 to route the communication to the application 125 in the mobile device 105. In some implementations, the application 125 can operate to provide a user interface experience similar or identical to an incoming communication received over a cellular radio network. In the case of a message (e.g., SMS), the bridge MSC 145 can simply send the message to the application server for delivery to the application 125. In the case of a call, the bridge MSC 145 operates to connect the call received over SS7 or other cellular backbone network 155 to an IP call (e.g., VoIP) that the application server 130 establishes between the application 125 and the bridge MSC 145.

In some implementations, the SIM 135 for the mobile device 105 can be replaced with an alternative SIM 136 associated with a different home cellular network. The application 125 and the application server 130 can redirect communications that are directed to the MSISDN associated with the SIM 135 to the mobile device 105 with the alternative SIM 136. For example, the application server 130 can store an association of the identity for the SIM 135 with the alternative SIM 136. In this situation, instead of routing incoming communications received at the bridge MSC 145 to the application 105 on the mobile device 105, the application server 130 can route the communication to a Session Initiation Protocol (SIP) gateway 165 (e.g., by sending a message receive via the bridge MSC 145 to the SIP gateway 165 or establishing a VoIP connection between the bridge MSC 145 and the SIP gateway 165) associated with a visited MSC 170 currently serving the mobile station 105 with the alternative SIM 136. The SIP gateway 165 and/or visited MSC 170 can be identified by querying an HLR associated with the SIM 136 or an incoming call can otherwise be routed to the MSISDN associated with SIM 136. The communication can thus be routed to the mobile device 105 through a base station 175 serving the mobile device 105. By routing communications to the mobile device 105 using an alternative SIM 136, a user of the mobile device can receive communications directed to the user's normal telephone number, for example, while roaming internationally, which can enable the user to avoid high international roaming charges.

Figure 2:
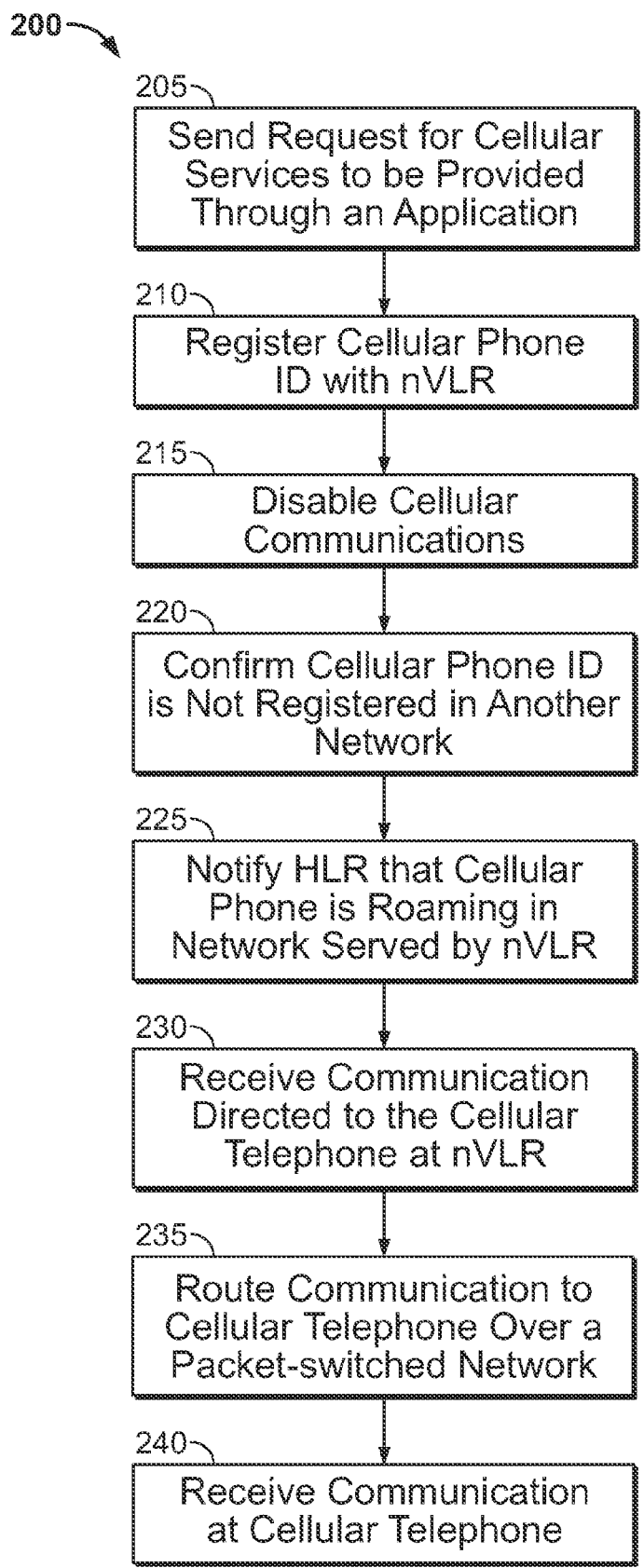
FIG. 2 is a flow diagram of a process for routing communications directed to a cellular identity of a mobile device to an application on the mobile device.

FIG. 2 is a flow diagram of a process 200 for routing communications directed to a cellular identity of a mobile device to an application on the mobile device. A request for telephone services associated with a cellular telephone identifier is sent at 205 from the application to a server using a wireless access point connected to a packet-switched or Internet protocol network. The request can be for such services to be provided to the mobile device through the application using a WLAN connection rather than through a cellular radio access network. The request can include a unique application instance identifier for the application installed on the mobile device, which can have an existing association with the cellular identity of the mobile device (e.g., the MSISDN or IMSI). The request can be initiated, for example, in response to detecting adequate connectivity through a wireless access point to support voice over Internet Protocol communications. Alternatively, or in addition, the request can be initiated in response to satisfying one or more parameters. For example, the parameters can relate to the relative quality of cellular and WLAN connections (e.g., to give best quality service such as when there is marginal cellular service); settings allowing user to choose to receive calls based on the quality of the connection; automatically detecting bad cellular reception (e.g., based on received signal strength indicator (RSSI), bit error rate, dropped calls, low codec quality, etc.); location (e.g., to reduce costs when roaming); proximity to a home or office; based on access to a certain WiFi network; or time of day. In response to the request, the cellular telephone identifier is registered with a visitor location register associated with a bridge MSC adapted to receive communication through a cellular backbone network and route communications over a packet-switched network at 210. Cellular communications using the cellular telephone identifier are disabled at 215, either before or after the registration with the VLR. Such disabling can be performed automatically by the application or through a manual operation by a user. A confirmation that the cellular telephone identifier is not registered in another cellular network is performed at 220. The confirmation can be performed by the visitor location register, for example.

A home location register associated with the cellular telephone is notified that the cellular telephone is roaming in a network served by the visitor location register at 225. This notification can be made even though the cellular telephone may actually be in a different location and is not actually using cellular communication features due to disabling of cellular communications. The VLR can provide a MSRN that is selected so as to avoid or reduce toll charges. After the cellular telephone is registered with the VLR at the HLR, a communication directed to the cellular telephone is received at the bridge mobile switching center at 230. The communication can be, for example, a voice call, a text message, an image message, or a video call. The received communication is routed to the cellular telephone over a packet-switched network at 235. The communication can be routed to an application on the cellular telephone. Alternatively, the communication can be routed to a number associated with an alternative SIM temporarily installed in the cellular telephone. The communication directed to the cellular telephone identifier is received from the bridge mobile switching center over a packet-switched network through an application on the cellular telephone or through a cellular connection with the alternative SIM at 240. Following receipt of the communication, a call log or a message record can be synchronized with calls or messages received using a cellular connection.

Blocking Routing of Communications Through a Packet-Switched Network

In some cases, a home cellular operator may wish to prevent forwarding communications to a third party and may wish to prevent this kind of undesired forwarding. In the following embodiments, the term "block communication" means either preventing a certain message from passing through, or sending a message that interferes with the normal communication such as sending a cancel registration to the nVLR for the IMSI. The following embodiments can be used alone or in any suitable combination. A home operator may discover undesired forwarding by identifying the nVLR as an undesired VLR for roaming, and comparing the VLR reported to the HLR with the SS7 address of the nVLR. The home operator may block all network traffic to the operator that supports the nVLR to stop communication with the nVLR, or block some or all of the traffic going to the nVLR. For example, the operator can by default not allow roaming to the operator, and require users to specifically request authorization for roaming in the operator's network. Alternatively, the home operator may compare the time that passed since the user disconnected from one network to the time the user is registered with the nVLR and, if this time difference is below a threshold, disrupt the communication. In some embodiments the threshold may be affected by the distance between the territory of a network from which the user disconnected to the territory of the nVLR. In another embodiment, the home operator may block communication of the pattern of events created by the nVLR, such as a send routing info for short message followed by registration of the user in a territory different than the previous territory. In another embodiment, the home operator may block communication in case the MSRN provided by the nVLR is not in the country or territory of the operator that supports the nVLR. In another embodiment, the home operator can hide the IMSI of the user by providing within a Send-Routing-Info-for-Short-Message an IMSI number different from the IMSI number associated with the user's SIM, thus not allowing the ASP to discover the IMSI of the subscriber as stored in the SIM card. In another embodiment, the home operator can report a VLR address in the response for a send routing info for short message service, which is different from the VLR currently serving the user and have the incoming message delivered to this VLR instead of the serving VLR. Then, the operator can deliver the SMS to the subscriber to the serving VLR. In some embodiments the report VLR can be reported even if the user is not under service at all, and the message can be delivered to the user once he is active online again. In such an embodiment, the nVLR might conclude that the subscriber activated his SIM in a mobile network and therefore deregister the subscriber from the nVLR. In another embodiment, the home operator can include an application on the SIM of the user, to which the home operator sends a message. If the message is not acknowledged by the application to the home operator, then the home operator can deregister that IMSI from its serving VLR, or otherwise disrupt the communication with the VLR. The message sent to the application as well as the acknowledgement can be cryptographically protected to avoid impersonation by entities other than the SIM. In such an embodiment, as the SIM is not online, the application would not receive a message and therefore the nVLR which is acting as the VLR for that IMSI would deregister the user or its communication would be disrupted.

Figure 3:
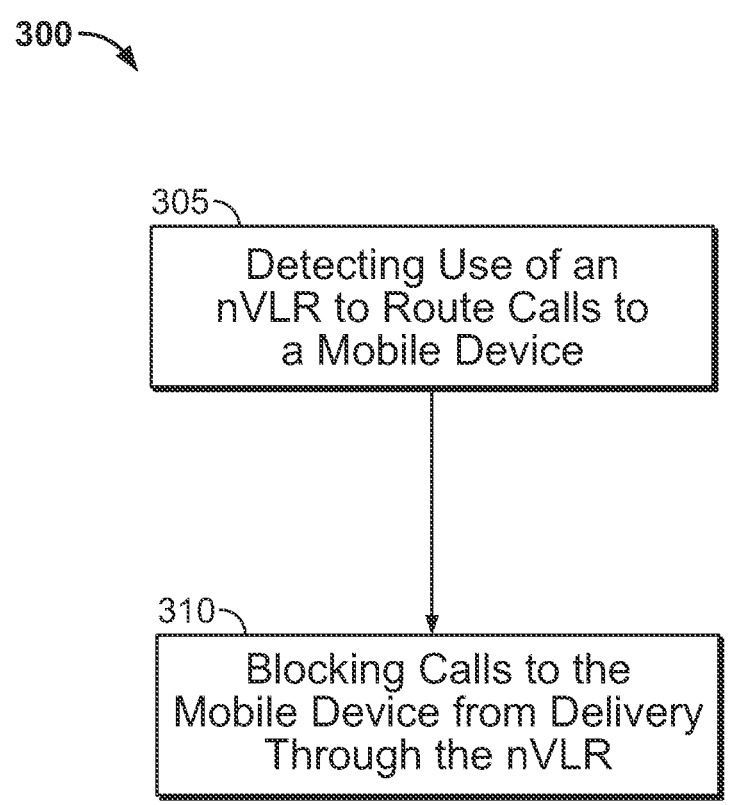
FIG. 3 is a flow diagram of a process for blocking communications directed to a cellular identity of a mobile device from being routed to an application on the mobile device.

FIG. 3 is a flow diagram of a process 300 for blocking communications directed to a cellular identity of a mobile device from being routed to an application on the mobile device. Use of a visitor location register to forward calls to a mobile device using a packet-data network is detected at 305. Calls to the mobile device are blocked from being forwarded to the visitor location register based on the detected use at 310.

Discovery and Verification of Cellular Identity

In some implementations, an ASP may desire to determine the MSISDN or other cellular identity of a registered phone using a process that avoids relying on a user providing such information. Such a process can include a discovery phase, in which the ASP learns of the user's possible MSISDN (i.e., a "discovered number"), and a verification phase in which the ASP verifies that the user has access to the MSISDN or other cellular identity obtained during the discovery phase.

In an illustrative embodiment of the discovery phase, the nVLR sends a phone number associated with a first gateway interface of the nVLR to the mobile application. The mobile application then initiates an outgoing call to the phone number. When the call reaches the nVLR, the nVLR can discover the MSISDN of the registered phone from the caller identification (caller ID) information for the incoming call. The mobile application can hide on the user interface the fact the phone is dialing to avoid confusing the user. The nVLR can further configure the first gateway interface to reject the call immediately once received, thus occupying the user's cellular phone radio for only a short amount of time. In some cases, the user's account can be configured to not send a caller ID, which would prevent the nVLR from receiving the user's number. To handle such a situation, the mobile application can instruct the phone to ask the network to allow caller ID just for this call by adding the prefix *31# to the phone. For example, if the phone number associated with the first gateway interface is +12021234567 then the mobile application can instruct the phone to dial *31#+12021234567. Alternatively, the application can enable Caller ID presentation prior to dialing the phone number. The application can also check the callerID-presentation status on the subscription of the user in the network prior to enabling caller ID, and if callerID presentation is disabled prior to the application enabling callerID, the application can disable callerID presentation after the call to the nVLR is made, placing the user's subscription profile on the network back in its original callerID-presentation state.

In an illustrative embodiment of the verification phase, the nVLR issues an outgoing call to the discovered number where the call includes a caller ID chosen out of a range or list of possible caller IDs. The mobile application receives the caller ID from the phone and reports the received callerID back to the nVLR. As the user did not know which caller ID would be called, reporting the correct callerID back to the nVLR proves that the application had access to the user's phone number. The nVLR compares the received callerID from the application to the caller ID used to call the discovered number. If the numbers match, the discovered number is verified. Otherwise, the verification fails. The range of callerID used to generate the call can be chosen from a space large enough to provide a reasonable assurance against an attack. For example, if the caller ID is chosen randomly and uniformly out of a space of 10,000 possible caller IDs, the probability of an attacker succeeding in verification without receiving the call is at most 1/10000. Better security can be achieved if choosing the caller ID from a larger possibility space, or by repeating the process several times. Alternatively, the caller ID can be set to be a randomly generated number that does not necessarily represent an actual telephone number. In some embodiments, the nVLR compares only several of the digits of the received callerID. In other embodiments, the application may report the result of a function applied to the caller ID back to the server, and the server performs a similar function and compares the results. If the results match, the discovered number is verified, and otherwise, verification fails.

It could be important to make efficient use of the phone numbers associated with the first gateway interface in the nVLR for the purpose of discovery. Therefore, several registered phones may be allocated the same phone number to call in the same time period. Therefore, the nVLR would have a list of several discovered MSISDNs. The nVLR can call these MSISDNs during the verification process. The nVLR can successfully verify an MSISDN if the callerID received back from the application matches the callerID used in the outgoing call, and it also identifies that the instance of the mobile application that reported the callerID possesses the discovered MSISDN. The verification process can be used together with the discovery process described above, or with another discovery method.

In an alternative illustrative embodiment, a USSD (Unstructured Supplementary Service Data) message with a pin code can be sent from the nVLR to the discovered phone number. The user can type in the received code back into the mobile application, or the application can automatically retrieve the pin code from the USSD message. The mobile application reports the pin code back to the nVLR, which compares the sent code to the received code, and if they are identical the discovered phone number is verified. Otherwise, the verification fails, as only someone with access to the registered phone can receive the USSD with the pin code. A mathematical function can be applied on the pin code by the mobile application before returning it to the nVLR as well as by the nVLR prior to comparing the values. In an alternative implementation, an SMS message or another message can be used instead of a USSD.

Figure 4:
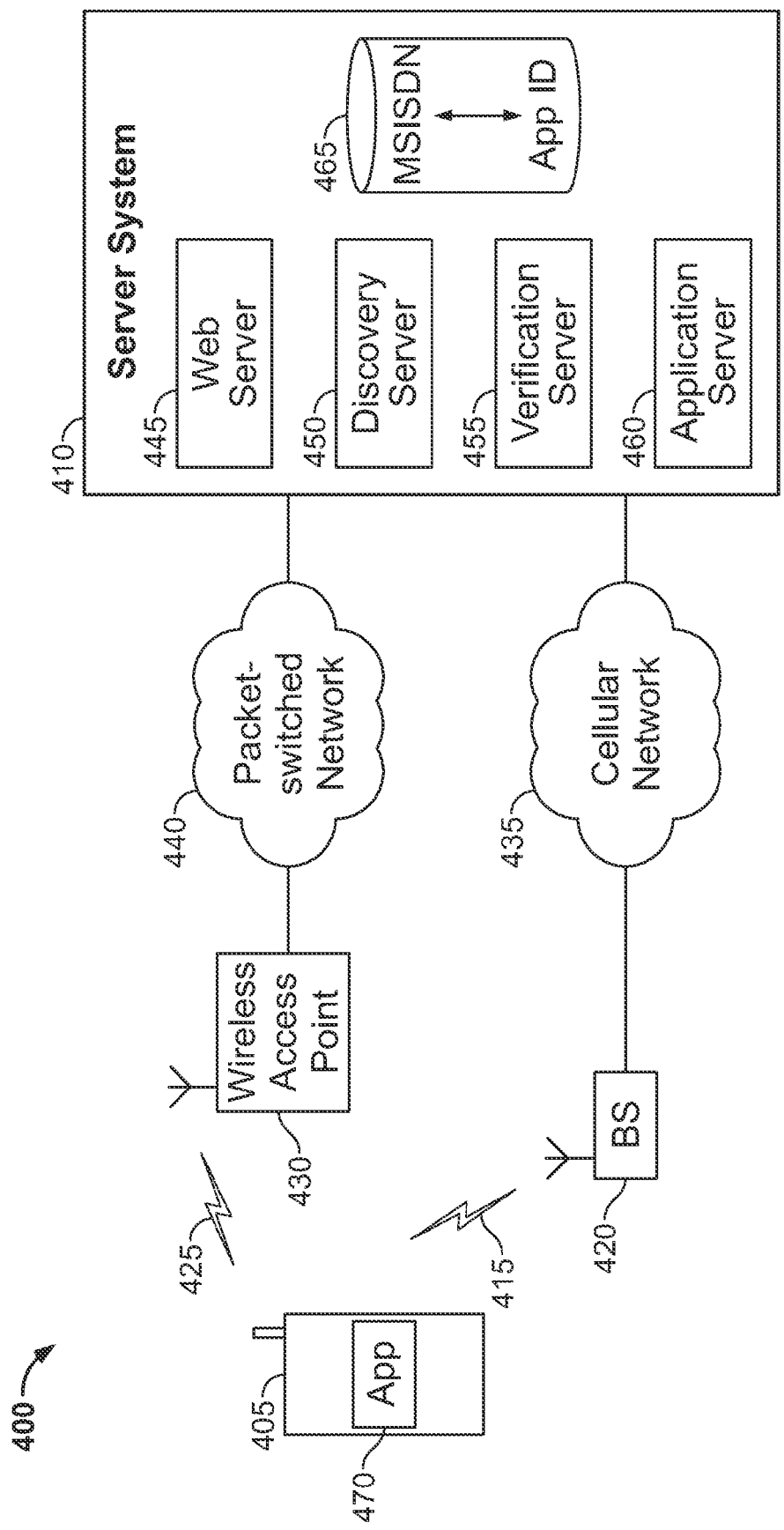
FIG. 4 depicts a discovery and verification system for discovering and verifying a cellular identity.

FIG. 4 depicts a discovery and verification system 400 for discovering and verifying a cellular identity. The system 400 includes a mobile device 405 and a server system 410. The mobile device 405 includes dual capabilities for communicating with a base station 420 in a cellular radio network over a wireless interface 415 and with a wireless access point 430 in a wireless local area network (WLAN) over a wireless interface 420. Communications via the base station 420 are routed over a cellular network 435 and communications via the wireless access point 430 are routed over a packet-switched network 440 (e.g., the Internet). The server system 410 is also connected to and capable of communicating over both the cellular network 435 and the packet-switched network 440. The server system 410, or certain servers within the server system 410, can communicate over the cellular network using a gateway interface (not shown) internal or external to the server system that enables the server system 410 to initiate and receive calls and/or cellular messages. The server system 410 includes a web server 445 that allows access to an application that can be downloaded by mobile devices (including mobile device 405) and/or setting up a user account with the server system 410. The application can also be obtained in other ways. The server system 410 includes a discovery server 450 that facilitates discovery of the MSISDN or other cellular identity associated with the mobile device 405. The discovery server 450 can also facilitate discovery of an application instance identifier for an application 470 on the mobile device 405 and can at least tentatively associate the application instance identifier with the MSISDN or other cellular identity. The server system 410 includes a verification server 455 that facilitates verification of the MSISDN or other cellular identity after it is discovered by the discovery server 450 or otherwise obtained by the server system. The verification server 455 can also facilitate verification of the application instance identifier for the application 470 on the mobile device 405 and/or can verify an association of the application instance identifier with the MSISDN or other cellular identity. The server system 410 further includes an application server 460 can provide services to the application 470. The application 470 and application server 460 can correspond to the application 125 and application server 130 discussed in connection with FIG. 1 or can be a different application and application server. Finally, the server system 410 includes a database 465 that stores an association of the application instance identifier with the MSISDN or other cellular identity.

After the application 470 is installed or otherwise associated with the mobile device 405, the application 470 can be used to initiate and/or receive communications with the server system 410 for purposes of discovering and verifying the MSISDN or other cellular identity and/or an association of the application instance identifier with the MSISDN or other cellular identity as further described below. In general, discovery and verification can be performed in part by detecting information (e.g., timing of a sequence of calls placed to the MSISDN or a callerID included in the calls) associated with one or more communications directed to and/or received from the MSISDN or other cellular identity. In addition, discovery and verification can be performed in part based on communications over the packet-switched network 440.

Figure 5:
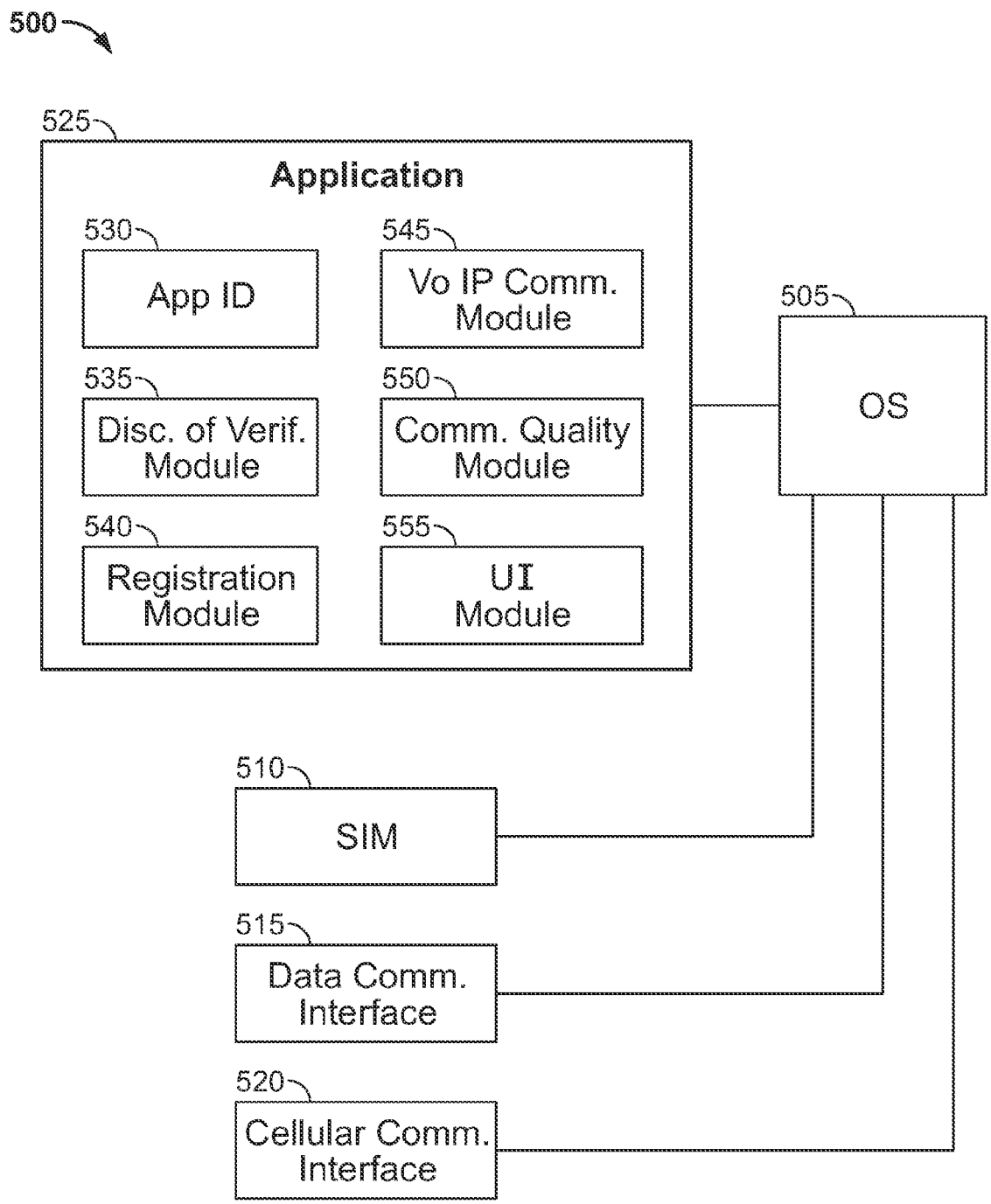
FIG. 5 depicts a block diagram of components on a mobile device that can be used in the systems of FIGS. 1 and 4.

FIG. 5 depicts a block diagram of components on a mobile device 500 that can be used in the systems of FIGS. 1 and 4. The mobile device 500 includes an operating system 505, a SIM 510 used for maintaining a cellular identity, authorizing cellular communications, and accessing services over a cellular radio access network, a data communication (e.g., WiFi) interface 515, a cellular communication interface 520, and an application 525 that provides a user with access to services separate from those accessed over the cellular radio access network. In providing access to services, the application 525 interfaces with the operating system 505 to request information and access to other functions supported by the mobile device 500. For example, the application 525 can initiate and receive communications over the data communication interface 515 and the cellular communication interface 520 and issue instructions to control one or more user interfaces (e.g., screen or speaker) or features (e.g., call forwarding) on the mobile device 500.

The application 525 stores an application instance identifier 530 that uniquely identifies the particular instance of the application on the mobile device 500. The application includes a discovery and verification module 535 that can communicate with discovery and verification servers to facilitate discovery and verification of a cellular identity and the application instance identifier. The discovery and verification module 535 can receive and initiate communications over the data communication interface 515 and the cellular communication interface 520 and can control user interfaces and device features. A registration module 540 can be used to initiate requests to register with an nVLR to conduct communications over a packet-switched network. The registration module 540 can initiate such requests based on predetermined criteria or in response to a user's manual interactions with the application. A VoIP communication module 545 is used to establish VoIP communications over the data communication interface 515. A communication quality module 550 can monitor WiFi and/or cellular communication quality to help determine when request or terminate registrations with an nVLR. A user interface module 555 is used to enable the application to control (e.g., disable) user interfaces on the mobile device 500 and to display graphical user interfaces displayed on the mobile device for allowing a user to interact with functionality and features of the application 525. The application 525 can also include other modules other than those depicted and described.

Figure 6:
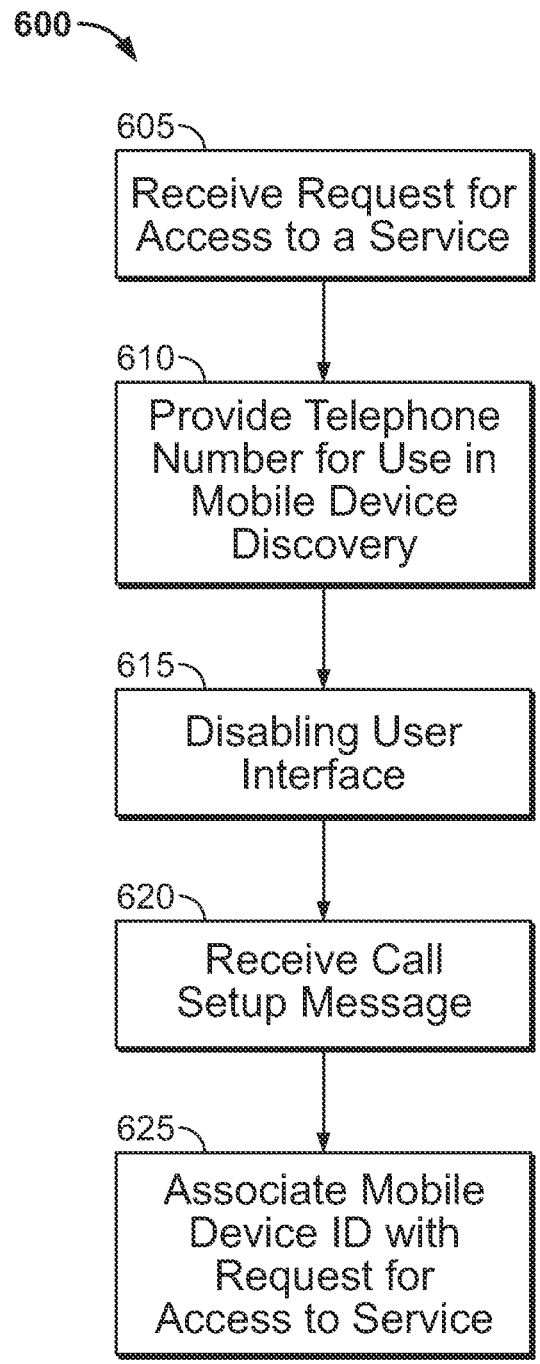
FIG. 6 is a flow diagram of another process for discovery of a mobile identity and an association of the mobile identity with an application instance identifier for an application on the mobile device.

FIG. 6 is a flow diagram of another process 600 for discovery of a mobile identity and an association of the mobile identity with an application instance identifier for an application on the mobile device. A request to access a service to be provided for a mobile device is received at 605. The request for access can represent a request to establish an account associated with the service, for example. The request can be received from an application on the mobile device and can include a request to activate the application for use on the mobile device. The request can also include an application instance identifier for the particular application instance. The request can be initiated automatically after installation of the application, during a period when the mobile device is otherwise inactive and/or during low usage hours, or in response to a manual request from a user. A telephone number associated with a server adapted for discovery of a mobile device identifier associated with the mobile device requesting access to the service is provided at 610. The telephone number can be provided as part of an application or in response to a request for the telephone number. Alternatively, a contact which includes the telephone number can be defined on the mobile device. A user interface display on the mobile device is disabled at 615 in advance of automatically for a telephone call using the telephone number. Alternatively, a splash screen can be displayed when placing the telephone call. A telephone call setup message is received from the mobile device directed to the telephone number at 620. The telephone call setup message includes signaling used to indicate a call is requested (e.g., to cause the destination phone to ring) but does not involve a voice connection until after the call is answered. The application on the mobile device can cancel the telephone call setup message after ringing begins or after some predetermined time or the server can reject the incoming call to ensure that a call connection is not established. The mobile device identifier is associated with the request for access to the service in response to receiving the telephone call setup message from the mobile device directed to the telephone number at 625. In addition, the mobile device identifier can be associated with the application instance identifier based on an inclusion of the application instance identifier in the request for access to the service. Authorization for access to the service can be provided based on the discovery of the mobile device identifier and/or its association with the application instance identifier or based on a subsequent verification procedure.

Figure 7:
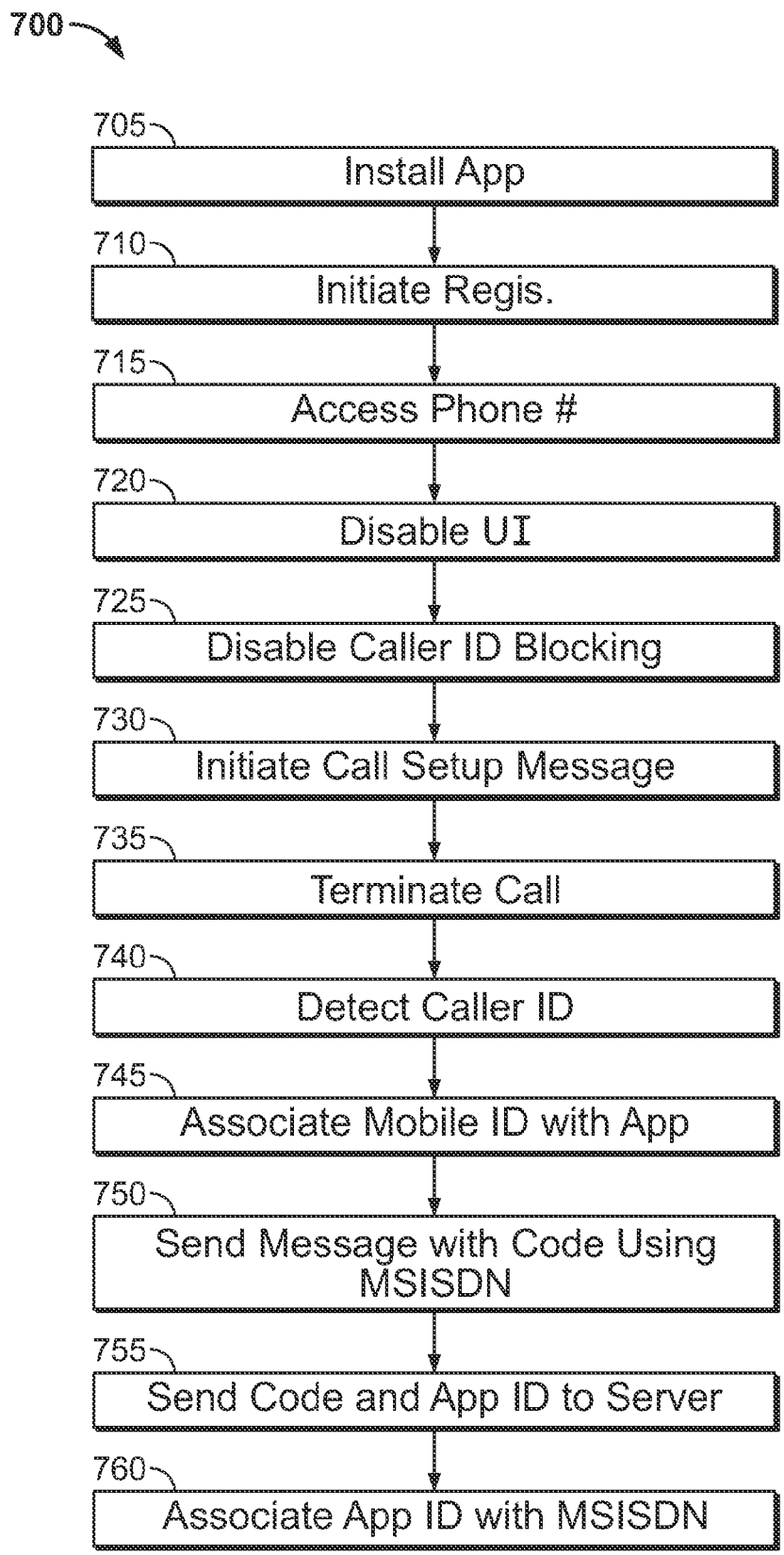
FIG. 7 is a flow diagram of another process for discovery of a mobile identity and an association of the mobile identity with an application instance identifier for an application on the mobile device.

FIG. 7 is a flow diagram of another process 700 for discovery of a mobile identity and an association of the mobile identity with an application instance identifier for an application on the mobile device. According to the process 700, the application is preconfigured with a telephone number for the application to call. The process 700 can be carried out by a mobile device and a server system. The application is installed on the mobile device at 705 (e.g., by downloading the application from a server). Registration of the application on the device is initiated at 710. A predetermined telephone number stored on in the application and associated with a verification server is accessed at 715. In some cases, a user interface display on the mobile device is disabled or a splash screen or other information is presented on the display at 720 to conceal an automatic call. If necessary, a caller ID blocking feature is disabled at 725. A telephone call setup message is initiated from the mobile device directed to the telephone number at 730. The telephone number can be associated with a discovery server for use in discovery an identifier for the mobile device. A telephone call requested in the telephone call setup message is terminated before a voice connection is established at 735. Based on the telephone call setup message, the caller ID of the mobile device is detected at 740 (e.g., by the discovery server). The caller ID can reveal (or allow retrieval from an HLR or other database) the MSISDN, IMSI, and/or other mobile device identifier for the mobile device. The mobile device identifier is associated with the application at 745 in response to receiving the telephone call setup message from the mobile device directed to the telephone number (i.e., the server knows that the mobile device with the mobile device identifier has the application installed but does not know the identifier for the particular application instance). A message (e.g., a USSD or SMS message) including a code (e.g., a pin code) is sent to the mobile device using the mobile device identifier at 750. A communication from the mobile device including the code and including the application instance identifier for the application is sent by the application on the mobile device at 755 (e.g., to the discovery server). The communication is associated with the telephone call setup message based on the code and the application instance identifier included in the communication is associated with the mobile device identifier identified based on the telephone call setup message at 760. As an alternative to a USSD or SMS, another verification flow can be used, such as the one described in process 900 below.

Figure 8:
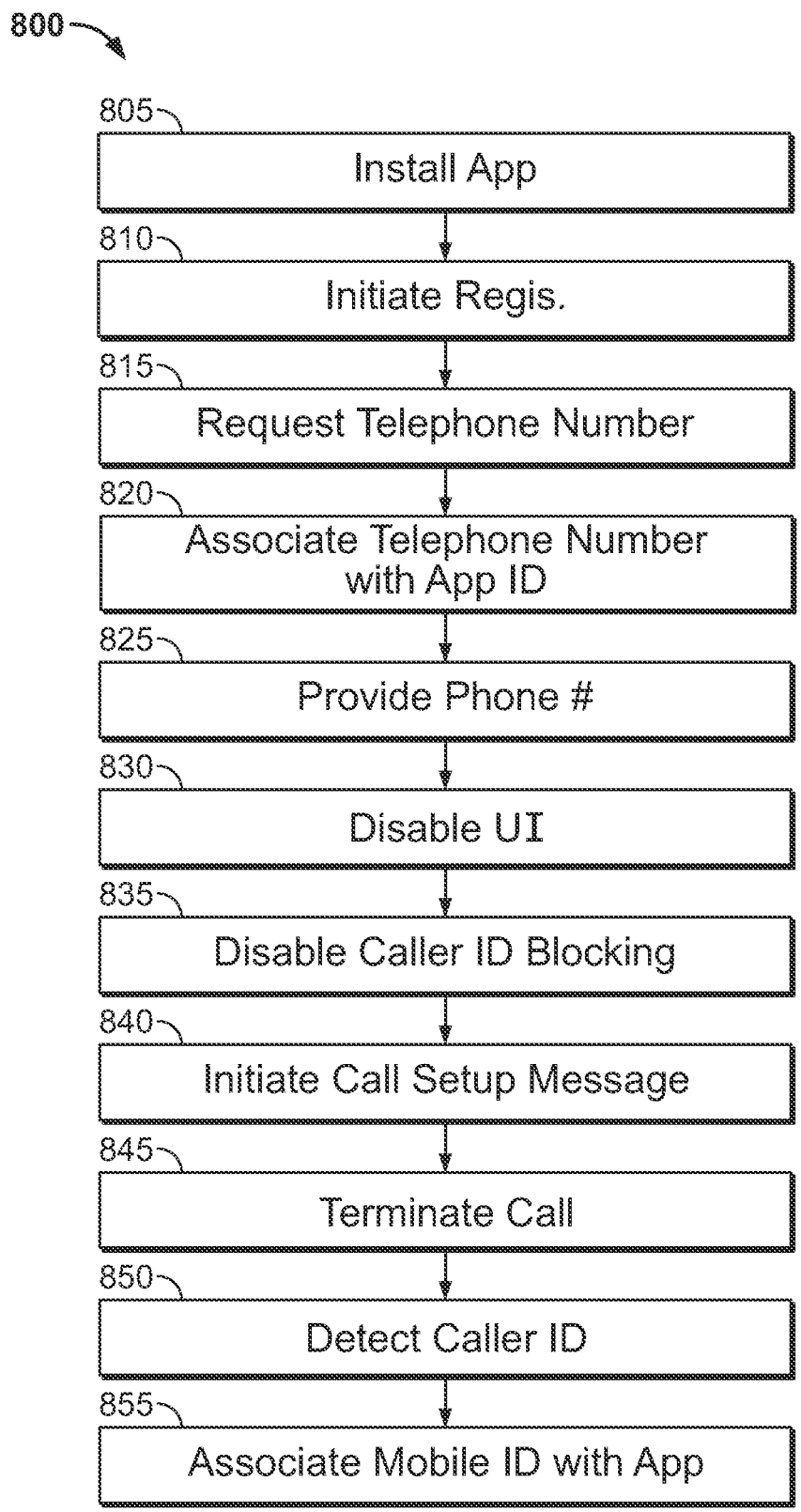
FIG. 8 is a flow diagram of another process for discovery of a mobile identity and an association of the mobile identity with an application instance identifier for an application on the mobile device.

FIG. 8 is a flow diagram of another process 800 for discovery of a mobile identity and an association of the mobile identity with an application instance identifier for an application on the mobile device. According to the process 800, the application requests the telephone number for use in initiating a call from a server. The application is installed on the mobile device at 805. Registration of the application on the device is initiated at 810. A request is received for a telephone number associated with a discovery server at 815. The request can include the application instance identifier for the application. A telephone number for the server is associated with the application instance identifier at 820, and the telephone number is provided by the server to the application in response to the request at 825. The process 800 continues in a similar manner to process 700 with actions defined at 720-745 except that the mobile device identifier can be associated with the application instance identifier based on the known association between the telephone number for the server and the application instance identifier and the receipt of a call at the server telephone number from the caller ID of the mobile device. The actions of 750 to 760 can be repeated in process 800 instead of sending the application instance identifier at 815. Alternatively, these actions can be repeated to verify the association between the mobile device identifier and the application instance identifier.

Figure 9:
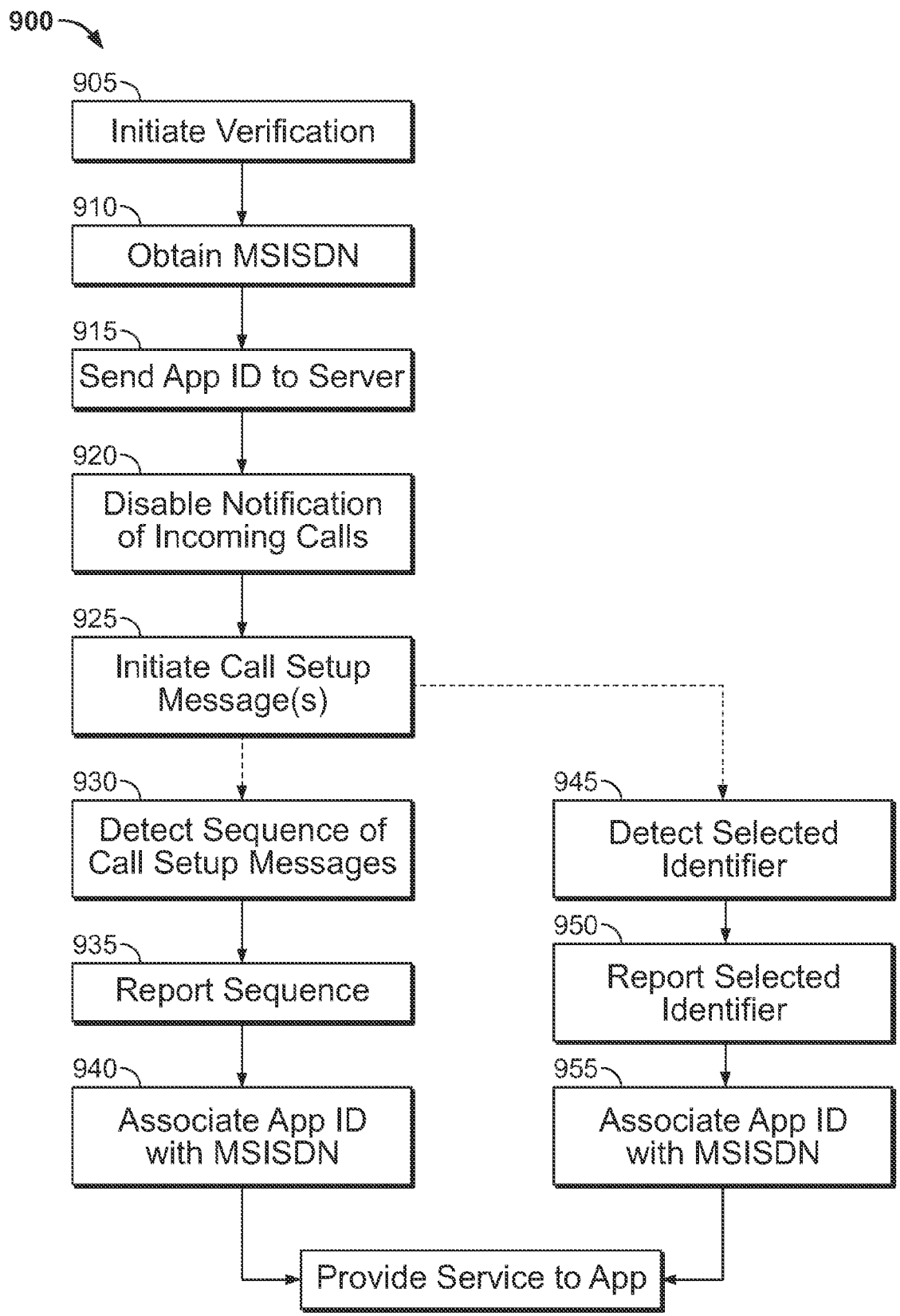
FIG. 9 is a flow diagram of a process 900 for verification of a mobile identity and an association of the mobile identity with an application instance identifier for an application on the mobile device.

FIG. 9 is a flow diagram of a process 900 for verification of a mobile identity and an association of the mobile identity with an application instance identifier for an application on the mobile device. A request to verify an application, having an associated application instance identifier, installed on a mobile device is received at 905. The request to verify can be automatically initiated after discovery of the mobile identity or at some other appropriate time or in response to a user request to activate the application or initiate the verification. A mobile device identifier used to communicate with the mobile device is obtained at 910 using one of the discovery techniques described above or some alternative technique. The application instance identifier associated with the application is sent to a server system at 915. The application instance identifier can be sent in a request from the application to initiate the verification procedure, in a response to a message from the server that verification is ready to begin, or in some other communication. A user notification feature (e.g., ringing, vibration, and screen display) of incoming telephone calls is temporarily disabled on the mobile device at 920. The application can disable the user notification feature through the mobile device operating system. In some implementations, the application can notify the verification server that the user notification feature has been disabled and thus that the application is ready to receive incoming call setup messages for verification purposes. The user notification feature can be re-enabled after the verification procedure is complete. For example, the server can inform the application that the procedure is complete. In some implementations, the application can display a splash screen during the verification process so that the user is informed that the mobile device is temporarily unavailable and/or to prevent the user from interfering with the process.

One or more telephone call setup messages directed to the mobile device using the mobile device identifier are initiated (e.g., by the verification server) at 925. The one or more telephone call setup messages are initiated by a server for use in verifying an association of the application instance identifier with the mobile device identifier. These telephone call setup messages can be terminated before a voice connection is established. In some implementations, the application on the mobile device detects a sequence of telephone call setup messages (e.g., timing and receipt) at 930 and reports the sequence of the telephone call setup messages to a server (e.g., over a data network) at 935. The application instance identifier is then associated with the mobile device identifier based on the reported sequence of the telephone call setup messages at 940. In particular, if the reported sequence matches the actual sequence, the verification server can confirm that the mobile device has authorization to use the MSISDN or IMSI. As an alternative to using a selected sequence of telephone call setup messages, at least one of the telephone call setup messages includes a selected identifier determined by a server for use in verifying an association of the application instance identifier with the mobile device identifier. In some implementations, the selected identifier is included in the telephone call setup message as a caller ID header. The application on the mobile device detects the selected identifier at 945 and reports the selected identifier to the verification server (e.g., over a data network) at 950. The application instance identifier is then associated with the mobile device identifier based on the reported selected identifier(s) including in the telephone call setup messages at 955. In particular, if the reported identifier matches the actual selected identifier, the verification server can confirm that the mobile device has authorization to use the MSISDN or IMSI. Furthermore, by including the application instance identifier in one or more of the reports to the verification server during the verification process, the verification server can further verify that the application instance identifier is associated with the mobile device identifier. Once the verification is complete, a service provided to or using the application is authorized for use by the mobile device at 960. Thereafter, the application on the mobile device can send the application instance identifier so that the application server can confirm that the service is authorized for the mobile device. In some implementations, instead of sending the actual application instance identifier, the application instance identifier can serve as a key that is processed through an algorithm (e.g., in response to a challenge message) and the result of the processing can be sent so that the application instance identifier is not compromised. Alternatively, the application instance identifier can be encrypted for any communications. Similarly, the detected selected identifier can be processed by the mobile application using a mathematical function prior to sending to a server.

Figure 10:
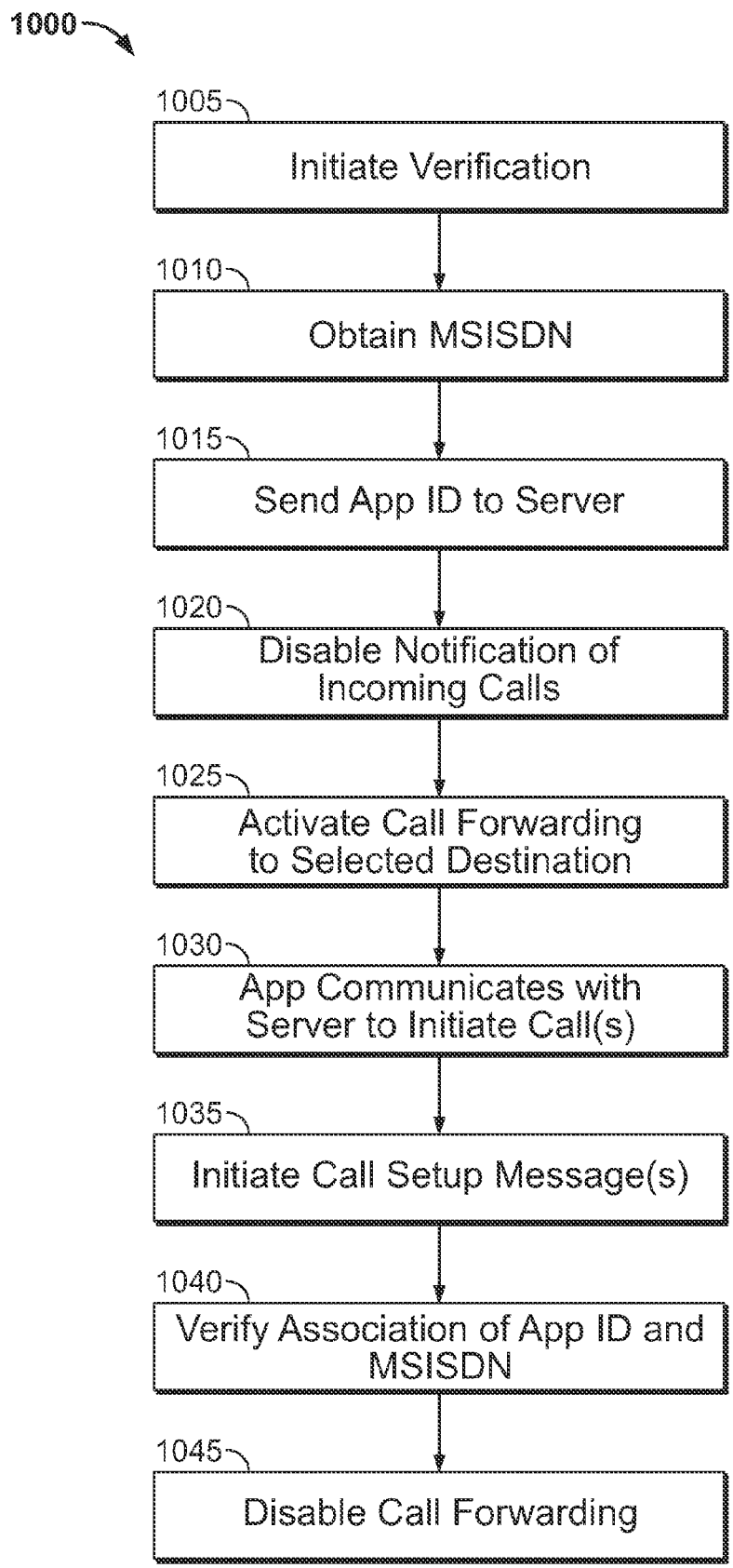
FIG. 10 is a flow diagram of an alternative process 1000 for verification of a mobile identity and an association of the mobile identity with an application instance identifier for an application on the mobile device.

FIG. 10 is a flow diagram of an alternative process 1000 for verification of a mobile identity and an association of the mobile identity with an application instance identifier for an application on the mobile device. The alternative process 1000 involves forwarding calls directed to the mobile station identifier to a telephone number associated with the server system. A request to verify an application, having an associated application instance identifier, installed on a mobile device is received at 1005. The request to verify can be automatically initiated after discovery of the mobile identity or at some other appropriate time or in response to a user request to activate the application or initiate the verification. A mobile device identifier used to communicate with the mobile device is obtained at 1010 using one of the discovery techniques described above or some alternative technique. The application instance identifier associated with the application is sent to a server system at 1015. The application instance identifier can be sent in a request from the application to initiate the verification procedure, in a response to a message from the server that verification is ready to begin, or in some other communication. In some implementations, a user notification feature (e.g., ringing, vibration, and screen display) of incoming telephone calls is temporarily disabled on the mobile device at 1020. However, because the process 1000 involves forwarding calls directed to the mobile device, it may not be necessary to disable the user notification unless the type of call forwarding activated allows the incoming call to be directed to the mobile device in addition to a forwarding number. The application can disable the user notification feature through the mobile device operating system. In some implementations, the application can notify the verification server that the user notification feature has been disabled and thus that the application is ready to receive incoming call setup messages for verification purposes. The user notification feature can be re-enabled after the verification procedure is complete. For example, the server can inform the application that the procedure is complete. In some implementations, the application can display a splash screen during the verification process so that the user is informed that the mobile device is temporarily unavailable and/or to prevent the user from interfering with the process.

Call forwarding to a selected destination is activated at 1025. The selected destination can be identified by the verification server and communicated to the application on the mobile device, for example. Typically, the call forwarding is initiated by the mobile device, e.g., by the application on the mobile device. In some implementations, however, call forwarding may be initiated by a server using the mobile device identifier. The application on the mobile device communicates with the server system to initiate one or more telephone call setup messages directed to the mobile device identifier at 1030. For example, the application can notify the server system when call forwarding is in place. One or more telephone call setup messages directed to the mobile device using the mobile device identifier are initiated (e.g., by the verification server) at 1035. The one or more telephone call setup messages are initiated by a server for use in verifying an association of the application instance identifier with the mobile device identifier. An association of the application instance identifier with the mobile device identifier is verified based on receiving forwarded call setup messages at the selected destination at 1040. For example, the mere receipt of forwarded call setup messages or detecting that the caller IDs of the forwarded call setup messages as received at the selected destination match the expected caller IDs can be used to verify that the mobile device possesses the MSISDN. Call forwarding is disabled by the application, the mobile device, or the server system at 1045 once the verification is complete.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions tangibly stored on a computer-readable storage device for execution by, or to control the operation of, data processing apparatus. In addition, the one or more computer program products can be tangibly encoded in a propagated signal, which is an artificially generated signal, e.g., a machine-generated electrical, optical, or electromagnetic signal, that is generated to encode information for transmission to suitable receiver apparatus for execution by a computer. The computer-readable storage device can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, mobile device, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what may be claimed, but rather as descriptions of features specific to particular implementations of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

I claim:

1. A computer-implemented method for verifying an association between a mobile computing device and an application, the method comprising:
   transmitting, by a mobile computing device, a request to a service to verify an application on the mobile computing device, wherein the application has an associated application instance identifier;
   conveying to the service a mobile device identifier that is used to establish a communication channel with the mobile computing device;
   disabling, at the mobile computing device, prior to receiving the one or more telephone call setup requests, a user notification feature of the mobile computing device;
   receiving, by the mobile computing device, one or more telephone call setup requests directed to the mobile computing device using the mobile device identifier and signaling to the mobile computing device a voice call, the one or more telephone call setup requests associated with a voice channel, wherein the one or more telephone call setup requests are initiated by the service for use in verifying an association of the application instance identifier with the mobile device identifier; and
   providing an indication to the service of the receipt of the one or more telephone call setup requests, the service establishing an association between the application instance identifier and the mobile device identifier in response to receiving the indication.

2. The method of claim 1, wherein the mobile device identifier is conveyed by a telephone call setup request from the mobile computing device to the service, the telephone call setup request including signalling to cause a destination to ring but not to establish a voice connection.

3. The method of claim 2, wherein conveying a mobile device identifier further comprises disabling a caller ID blocking feature.

4. The method of claim 2, wherein conveying a mobile device identifier further comprises canceling the telephone call setup request after the destination rings or after a predetermined time.

5. The method of claim 1, wherein the mobile device identifier comprises an international mobile subscriber identity (IMSI) number or a mobile subscriber integrated services digital network (MSISDN) number.

6. The method of claim 1, further comprising:
   transmitting a notification to the service that the mobile computing device is ready to receive the one or more telephone call setup requests.

7. The method of claim 1, further comprising receiving, by the mobile computing device, an indication that the user notification feature of the mobile computing device can be re-enabled.

8. The method of claim 1, wherein at least one of the received telephone call setup requests includes a selected identifier determined by the service, the method further comprising transmitting a transmitted identifier based on the selected identifier, the service using the transmitted identifier to verify the association between the application instance identifier and the mobile device identifier.

9. The method of claim 8, wherein the selected identifier is included in at least one received telephone call setup request as a caller ID header.

10. A non-transitory computer-readable storage medium encoded with instructions that, when executed by a data processing apparatus, cause the data processing apparatus to perform operations comprising:
   transmitting a request to a service to verify an application on a mobile computing device, wherein the application has an associated application instance identifier;
   conveying to the service a mobile device identifier that is used to establish a communication channel with the mobile computing device;
   disabling, at the mobile computing device, prior to receiving the one or more telephone call setup requests, a user notification feature of the mobile computing device;
   receiving one or more telephone call setup requests directed to the mobile computing device using the mobile device identifier and signaling to the mobile computing device a voice call, the one or more telephone call setup requests associated with a voice channel, wherein the one or more telephone call setup requests are initiated by the service for use in verifying an association of the application instance identifier with the mobile device identifier; and
   providing an indication to the service of the receipt of the one or more telephone call setup requests, the service establishing an association between the application instance identifier and the mobile device identifier in response to receiving the indication.

11. The non-transitory computer-readable storage medium of claim 10, wherein the mobile device identifier is conveyed by a telephone call setup request from the mobile computing device to the service, the telephone call setup request including signalling to cause a destination to ring but not to establish a voice connection.

12. The non-transitory computer-readable storage medium of claim 11, wherein conveying a mobile device identifier further comprises disabling a caller ID blocking feature.

13. The non-transitory computer-readable storage medium of claim 11, wherein conveying a mobile device identifier further comprises canceling the telephone call setup request after the destination rings or after a predetermined time.

14. The non-transitory computer-readable storage medium of claim 10, wherein the mobile device identifier comprises an international mobile subscriber identity (IMSI) number or a mobile subscriber integrated services digitial network (MSISDN) number.

15. The non-transitory computer-readable storage medium of claim 10, the operations further comprising:
   transmitting a notification to the service that the mobile computing device is ready to receive the one or more telephone call setup requests.

16. The non-transitory computer-readable storage medium of claim 10, the operations further comprising receiving an indication that the user notification feature of the mobile computing device can be re-enabled.

17. The non-transitory computer-readable storage medium of claim 10, wherein at least one of the received telephone call setup requests includes a selected identifier determined by the service, the operations further comprising transmitting a transmitted identifier based on the selected identifier, the service using the transmitted identifier to verify the association between the application instance identifier and the mobile device identifier.

18. The non-transitory computer-readable storage medium of claim 17, wherein the selected identifier is included in at least one received telephone call setup request as a caller ID header.

\* \* \* \* \*